Oct. 8, 1940.  A. M. GRAY, JR., ET AL  2,216,814
VIBRATION ISOLATOR
Filed April 7, 1938
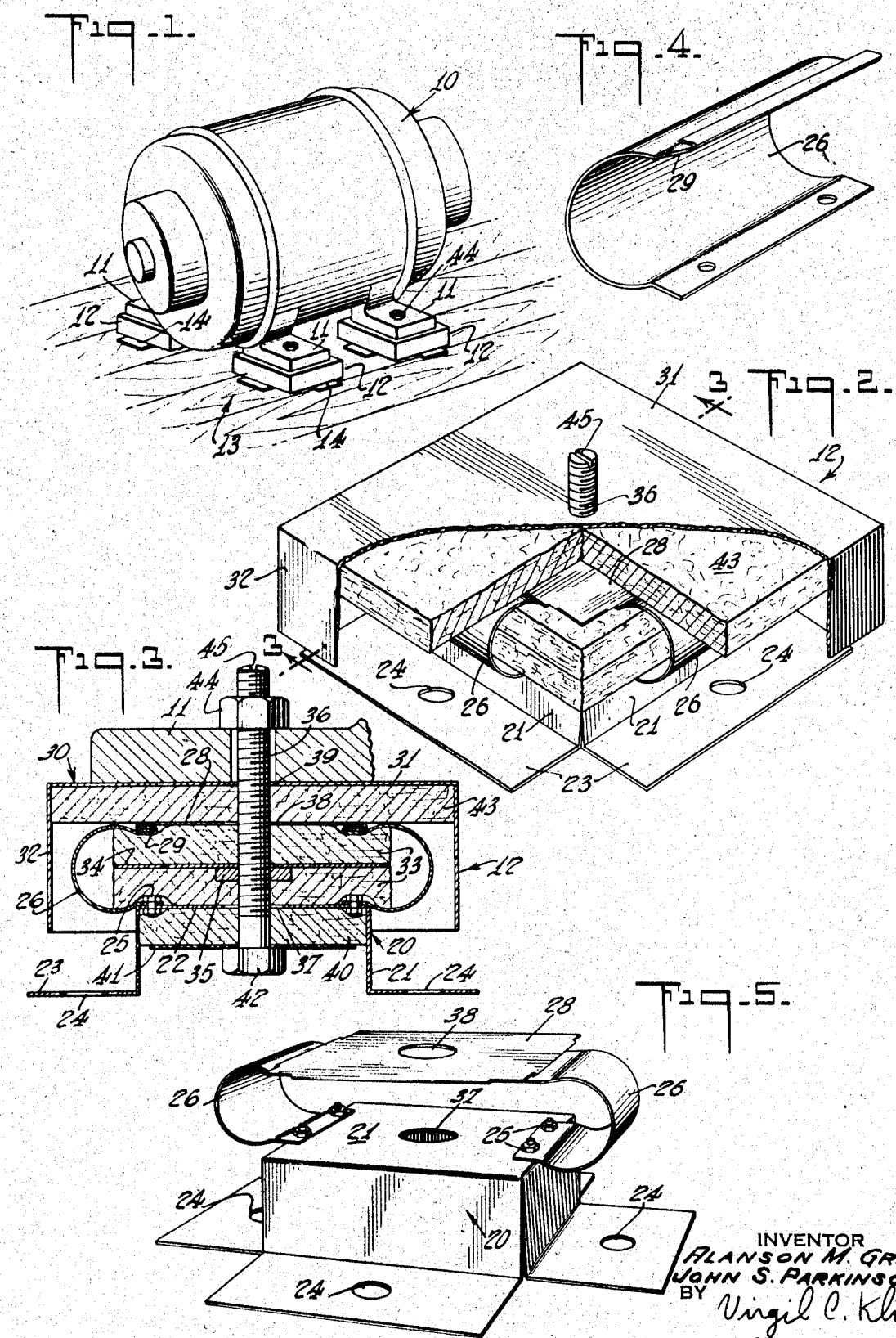
INVENTOR
ALANSON M. GRAY, Jr.
JOHN S. PARKINSON.
BY Virgil C. Kline
ATTORNEY Patented Oct. 8, 1940

2,216,814

UNITED STATES PATENT OFFICE 2,216,814

VIBRATION ISOLATOR

Alanson M. Gray, Jr., Elizabeth, and John S. Parkinson, Somerville, N. J., assignors to Johns-Manville Corporation, New York, N. Y., a corporation of New York Application April 7, 1938, Serial No. 200,634

12 Claims. (Cl. 248—21)

The present invention relates to machine supports and, more particularly, to means for mounting machinery in such a manner as to prevent the transfer of vibrations, developed by the operating machinery, to the supporting structure.

It has long been recognized that the direct mounting of machines, subject to vibration in operation, on a floor or other foundation results in the transmission of the vibrational movements of the machine directly to the foundation with resultant destructive and objectionable vibration of the support and undesirable noise in the operation of the machine. These recognized faults of rigid machine mountings have caused attempts to be made to isolate the machine vibrations from the foundation. Thus, it has heretofore been proposed to employ felt, rubber pads, springs, and similar resilient supporting means, and in some instances a combination of two or more of such means, between the machine base and the floor.

However, the prior proposed constructions, although partially effective in the attainment of their intended functions, do not provide a solution to all of the problems encountered. It has been determined that to fully meet the requirements of the art, the machinery support should be so constructed as to adequately isolate and dampen vibrations over wide ranges of frequencies, such as are commonly developed by many types of machines; isolate and absorb horizontal and rocking vibrational movements, as well as the vertical vibratory movements; exert a snubbing action to prevent vibrational movement of excessive amplitude; be capable of adjustment to obtain maximum overall efficiency under varying conditions and to permit leveling of the supported machine; and be simple of construction, while having the necessary strength to adequately support the machine against stresses tending to move the same in either a horizontal or vertical direction.

The present invention is particularly concerned with, and has for its principal object, the provision of an improved vibration isolating device of simple construction which will exhibit all of the above-stated functions.

Another object of the invention is the provision of a vibration isolator which is compliant to vibrational movements in any direction.

A further object of the present invention is the provision of an improved vibration isolating mounting employing spring elements and resilient pads or blocks in series in such a manner as to permit isolation of vibrations over wide ranges of frequencies.

Another object of the invention is the provision of an improved device of the above-stated type which includes resilient snubbing means to effectively limit the amplitude of the vibrational movements which the supported machine may undergo.

A still further object of the invention is the provision of adjustable means to permit alteration of the natural vibrational frequency of the spring members and which will serve the further purpose of a leveling means.

Further objects and advantages of the invention will become apparent when reference is made to the detailed description thereof which is to follow and to the accompanying drawing in which Fig. 1 is a perspective view of a machine, such as an electric motor, or the like, supported by vibration isolating devices of the present invention;

Fig. 2 is a perspective view of a vibration isolating mounting embodying the preferred form of the invention;

Fig. 3 is a sectional view taken on the line 3—3 of Fig. 2;

Fig. 4 is a detail view depicting an element of the vibration isolator; and

Fig. 5 is a perspective view of a portion of a mounting embodying a slightly modified construction.

Referring to the drawing, and particularly to Fig. 1, our invention is illustrated as employed in the mounting of a machine such as a motor 10 or the like on a suitable floor, or other foundation 13. In accordance with the preferred arrangement, a vibration isolator 12 is interposed between each of the several supporting feet 11 of the machine and the foundation 13, the isolator 12 being secured to the foundation by any suitable means. It will be understood that a motor is shown for the purposes of illustration only, and that the present invention may be employed in connection with the supporting of any type of mechanical equipment or other vibration-generating devices, or for supporting any other structures subject to vibration.

The mounting of the machine directly by the devices 12, as illustrated, has been found to be preferable. Inasmuch as this expedient can be employed only for a single machine or for unit machines, for example, motor-generator sets, motor-fan sets, and the like, in many cases the machinery may be carried by a suitable supporting platform on which it is directly mounted, the platform, in turn, being supported from the foundation or floor through the isolators 12. It has been found, however, as indicated above, that the direct mounting of the vibratile equipment on the isolators should be employed wherever possible, inasmuch as the use of a supported platform is conducive to some loss of efficiency of the isolating construction, apparently resulting from the restriction by the platform to simultaneous motion of the isolators in one direction and to the introduction of extraneous frequencies by vibration of the platform. Our invention, however, is not limited to any particular manner of mounting or arrangement of the isolating supports, and it is to be understood that the primary advantages of the invention are obtained when vibration isolating or absorbing devices, constructed in accordance with the present invention, are interposed in any suitable arrangement between a vibrating body and a foundation or other supporting base.

Referring now particularly to Figs. 2, 3, and 4, a vibration isolator 12 constructed in accordance with the present invention is illustrated in detail. The device comprises a member 20, which in a preferred form, consists of an inverted box-like element having side walls 21 and an end or top wall 22, the end wall being hereinafter referred to as a bed plate. The bed plate is apertured as indicated at 37 to receive a bolt member 36. The box-like member preferably includes feet 23 which may be flanged extensions of the side walls 21, the feet being apertured as at 24 to permit the passage of fastening screws, bolts, or the like, therethrough for anchoring the member to the supporting foundation. Where the isolator is supported on a concrete or similar foundation, the feet 23 may be embedded in the cementitious material of the foundation or a suitable grouting, or the like, may be poured over the feet 23. The member 20 may be suitably constructed of sheet steel or the like bent to its box-like form, or in lieu thereof, the same may be cast or be otherwise rigidly and strongly constructed to provide the support required.

Secured to the base member 20 by any suitable means, such as bolts 25, are a plurality of loop springs 26, illustrated in detail in Fig. 4. Although springs of the type illustrated are most suitable for use with the present isolator, the invention is not limited thereto. Other types of springs, for example, coil springs may be employed. Also, any suitable or conventional fastening means, such as welding, rivets, or the like may be substituted for the bolts 25. In the preferred embodiment of the invention disclosed in Figs. 2 and 3, four of the springs are employed, each having one end secured substantially centrally of one side of the bed plate 22 by the bolts or equivalent means previously referred to. The springs are made from spring steel or the like of such gauge and composition as will exhibit the desired static deflection and load factor, these, in turn, being determined by the load which each isolator must carry.

Carried by the upper ends of the springs 26 is a plate 28 suitably formed of sheet metal or the like. The springs may be secured to the plate in a manner similar to that in which they are connected to the bed plate 22, but preferably, as illustrated, they are formed for interlocking engagement with the plate 28. That is, the ends of the springs 29 are preferably bent into U-form and interlocked with corresponding U-shaped channels integrally formed at the edges of the plate 28, the cooperating portions of the springs and plates being crimped into binding engagement. The plate 28, constituting the load-bearing member of the isolating device, is provided with aperture 38 to receive therethrough the bolt 36.

In the space between the load-bearing plate 28 and the bed plate 22, there is provided one or more layers of a resilient material, such as felt, cork, rubber, or the like, pads of felt, particularly such as hair-felt, being preferably employed. Between preferably a pair of the resilient pads, a plate 34 is inserted, the plate 34 having integrally or otherwise connected thereto a nut 35 formed for threaded engagement with the bolt 36 extending through the device. The plate 34 is of such size that its edges will not contact the springs 26.

Under the bed plate 22 and within the box-like element constituting the member 20, a plate member 41 is provided having an opening through which passes the bolt 36, the plate member 41 being supported by a head or nut 42 on the bolt 36. The plate 41 may be of circular or other configuration and is of such size that its edges are out of contact with the side walls 21 of the base member. Between the plate 41 and the bed plate 22, a layer of resilient material, namely, felt, rubber, cork, or the like, similar to that employed for the pads 33, is provided.

The motor foot 11, or other element of the supported device mounted upon the isolators 12, rests upon the end surface 31 of a cover plate indicated generally at 30. The cover plate, in turn, rests upon and is spaced from the load-bearing plate 28 by a resilient pad 43 of felt, rubber, cork, or the like, similar in form and properties to the pads 33 and 40 previously referred to. The cover member 30 may be suitably provided with side flanges 32 extending downwardly to substantially completely enclose the vibration isolating device.

The apertures 37 and 38, provided respectively in the bed plate 22 and the load-bearing plate 28, as clearly illustrated in Fig. 3, are of such diameter that the plates will not contact bolt 36 extending through said apertures. As was previously pointed out, plate members 34 and 41, while directly contacting the bolt, are of such area as to be out of contact with the spring members or other portions of the isolator, with the exception of the bolt. It follows that there will be no metal to metal connection between the machine and the floor or other foundation, the fibrous or other resilient pads in each instance providing the direct contact between the supporting and supported elements of the device.

The threaded bolt 36 is of such length that it will extend completely through the device as illustrated, and also will extend through the foot 11 or other base element of the structure to be supported. Upon the threads at the upper end of the bolt, a nut 44 or other suitable fastening means may be employed for securing the foot 11 to the isolator, and to hold the isolator in assembled relationship. It will be obvious to one skilled in the art that suitable lock washers, locking nuts, cotter pins, or the like, may be employed in conjunction with the nut 44 to insure its retention in the proper position. The upper end of the bolt member 36 is slotted as indicated at 45 for manipulation with a screw driver or similar tool for a purpose later to be described.

Referring now particularly to Fig. 5, a slightly modified construction of the isolator is illustrated. In this figure, the member 20 comprising the bed plate 21, the springs 26, and the load-supporting plate 28 only, are shown for purposes of clarity, the resilient pads and other portions of the device being omitted. In this embodiment of the invention, but two springs 26 are employed, secured at opposite edges of the plates 21 and 28 preferably by bolts 25 and an integral interlocking construction, respectively. With the exception of the use of two springs only, the device is preferably in all respects similar to the device of Figs. 2 and 3.

In employing the vibration isolating devices of the present invention, previously described, the same are preferably placed beneath each foot of the machinery or other supported structure, or at suitable intervals beneath the machinery-supporting platform. In the mounting of the machine or platform by the vibration isolators of the present invention, after insertion of the devices in the proper position, for example, as illustrated in Fig. 1, the nuts 44 are tightened to draw up the bolts 36 until a snug fit is obtained. The supported machine is then operated, and during this operation the nuts are again adjusted, if necessary, until, as can be determined by inspection, the greatest efficiency at this stage is obtained.

To obtain maximum overall efficiency, and particularly in the event that the natural frequency of the operating machine is in substantial accord with, or approaches the natural frequency of the vibration isolator as previously adjusted, so that undue vibration of the supported device occurs, bolt 36 is rotated through the use of a screw driver, or the like, inserted in the slot 45, whereby the bolt 36 is moved upwardly relatively to the plate 34 to compress the pad 40 between plate 41 and bed plate 22. The nut 44 is then again tightened into snug engagement with the foot 11 and these adjustments are repeated until the best operation is obtained. Hence, by means of the dual adjustment provided, namely, adjustment of nuts 44 and 35, respectively, on the bolt 36, maximum efficiency of the isolator may be secured after the mounting of the machine and while the same is in operation, and such adjustments may be varied as is necessary to secure maximum efficiency under varying operating conditions of the supported machine. Adjustment of the nut 44 on the bolt 36, in conjunction with adjustment of the bolt 36 with respect to the plate 34, also permits leveling of the devices, as may be necessary due to variations in the foundation structure, for example, without, however, disturbing to any substantial extent the vibration isolating functions of the device.

In operation, the springs 26 are free to vibrate under normal conditions, the vibrations created by the supported machine being for the most part reflected by these springs. However, vibrations of higher frequencies, such as also may occur, and which are of too high a frequency to be absorbed by the springs, are absorbed by the resilient pads. Oscillations of the machine of excessive amplitude are prevented by means of the snubbing action provided by the plates 28 and 22 acting in conjunction with the pads 33 and 40, respectively. Thus, as will readily be observed, excessive upward or downward surges, such as might be permitted by springs 26 alone, will be resisted due to the resultant compression of the pads, this action taking place, however, without the occurrence of any sudden jars on the equipment.

The provision of the springs 26 at four sides of the device permits compliance to horizontal and rocking motions of the machine, as well as vertical vibration. The form of the invention, disclosed specifically in Fig. 5, where but two springs are employed, is particularly applicable for the supporting of machines having a predominate rocking or horizontal vibrational movement in but one direction. In this case, the isolators are so located that the springs 26 are parallel to the axis of said motion.

A device in accordance with the present invention has been found to comprise a solution to all the problems, previously recited, encountered in the supporting of vibrating machines and the like. Due to the employment of the springs and resilient pads in series, isolation against vibrations of both high and low frequencies are obtained, the resilient pads in the particular construction disclosed having the further advantage of preventing any metal to metal contact between the supporting and supported parts of the device, whereby transmission directly through the metal parts is wholly prevented. The snubbing action previously described allows the machine mounted on the isolators to move to but a limited degree in any direction, whereby shifting of the machine to displacements beyond the normal amplitudes of vibration is prevented. The device in accordance with the present invention has the further advantage of simplicity in construction and operation, while preventing vibrational movements of undue amplitude and permitting adjustment after installation to secure the greatest overall efficiency. An added feature of the invention is its flexibility for various uses. Thus, the same can be employed over a wide range of loads and driving frequencies without varying the essential form of the isolator by merely changing the spring factor, the shape or the length of the springs.

Having thus described our invention in rather full detail, it will be understood by those skilled in the art that these details need not be strictly adhered to, but that various changes and modifications will suggest themselves to those skilled in the art without departing from the scope of our invention as defined by the subjoined claims.

What we claim is:

1. A vibration isolating mounting comprising a bed plate supported from a foundation, a load-bearing plate, spring members supporting the load-bearing plate from the bed plate, resilient pads interposed between the bed and load-bearing plates, a bolt member extending through the bed and load-bearing plates and interposed pads and out of contact with said plates, said bolt member projecting beyond said plates, a plate member carried by the projecting end of said bolt below said bed plate, said plate member and the bed plate confining therebetween a resilient non-metallic pad and a resilient non-metallic pad overlying said load-bearing plate and arranged to support a vibratory device.

2. A vibration isolating mounting for vibratory machinery and the like comprising a bed plate supported from a foundation, a load-bearing plate supported from the bed plate by springs, resilient cushion members interposed between the bed and load-bearing plates, a bolt extending through the plates and interposed cushion members and projecting therebeyond, a plate member carried by the end of said bolt projecting past the bed plate, said plate member and the bed plate confining therebetween a cushion member, a cushion member resting upon said load-bearing plate, and a cover plate overlying said last-mentioned cushion member and providing a supporting surface for the vibratory device.

3. A vibration isolating mounting comprising a bed plate, a load-bearing plate, oppositely positioned loop springs having their ends secured to said bed plate and load-bearing plate, respectively, said springs supporting the load-bearing plate from the bed plate, and means including resilient pads interposed between and contacting said plates for yieldingly restraining excessive movement of said load-bearing plate relatively to the bed plate in any direction.

4. A vibration isolating mounting for machinery or the like comprising a base member, a load-bearing member, spring means supporting the load-bearing member from the base member, resilient pads interposed between said members, bolt means extending through the said members and interposed pads, and a plate member adjustably mounted on said bolt and interposed between said pads.

5. A vibration isolating mounting for a vibratory device comprising a bed plate supported from a foundation, a load-bearing plate for carrying said vibratory device, spring members supporting the load-bearing plate from the bed plate, resilient pads interposed between said bed and load-bearing plates, bolt means extending through the bed and load-bearing plates and interposed pads and projecting therebeyond, means cooperating with one projecting end of said bolt means for securing the vibratory device, means cooperating with the other projecting end of said bolt means for confining a resilient pad member between said last-named means and the under surface of the bed plate, and a plate member adjustably mounted on said bolt member and interposed between said first-mentioned pads.

6. A vibration isolating mounting for vibratory machinery or the like comprising a bed plate supported from a foundation, a load-bearing plate for carrying said vibratory machine, oppositely located loop springs supporting the load-bearing plate from the bed plate, resilient pads interposed between said bed and load-bearing plates, a bolt member extending through the bed and load-bearing plates and out of contact therewith and projecting therebeyond, means cooperating with one projecting end of said bolt member for securing the supported machine, means cooperating with the other projecting end of said bolt member for confining a resilient pad member between said last-named means and the under surface of the bed plate, and a plate member threadedly mounted on said bolt member and interposed between said first-mentioned pads.

7. A vibration isolating mounting for a machine or the like comprising a bed plate supported from a foundation, a load-bearing plate supported from said bed plate by oppositely located loop spring members, resilient pads interposed between said bed and load-bearing plates, a bolt extending through the bed and load-bearing plates and interposed pads and out of contact with said plates and projecting therebeyond, a pad-like member carried by said load-bearing plate, a cover member resting on said last-mentioned pad, one projecting end of said bolt extending through said pad and cover member, means acting in conjunction with a projecting end of said bolt for securing a machinery support over said cover member, means cooperating with the other projecting end of the said bolt for confining a resilient pad member between said last-mentioned means and the under surface of the bed plate, and a plate member threadedly mounted on said bolt interposed between said first-mentioned pads.

8. A vibration-isolating mounting comprising a bed plate, a load-bearing plate, spring means supporting the load-bearing plate from the bed plate, a resilient compressible non-metallic member overlying said load-bearing plate and arranged to support a vibratory device, and means for yieldingly restraining excessive movements of said spring means.

9. A vibration-isolating mounting comprising a bed plate, a load-bearing plate, spring means supporting the load-bearing plate from the bed plate, a resilient compressible non-metallic member overlying said load-bearing plate, a cover plate overlying said compressible non-metallic member and providing a supporting surface for a vibratory device, and means for yieldingly restraining excessive movements of said spring means.

10. A vibration-isolating mounting comprising a bed plate, a load-bearing plate, spring means supporting the load-bearing plate from the bed plate, a bolt member projecting through said plates and out of contact therewith, resilient non-metallic means confined between the bed plate and the end of the bolt member projecting therethrough, and a resilient compressible non-metallic member overlying said load-bearing plate and arranged to support a vibratory device.

11. A vibration-isolating mounting comprising a bed plate, a load-bearing plate, spring means supporting the load-bearing plate from the bed plate, a resilient compressible non-metallic member overlying said load-bearing plate, a cover plate overlying said resilient compressible member and providing a supporting surface for a vibratory device, a bolt member projecting through said plates and said resilient compressible member and comprising means for confining the vibratory device against said supporting surface.

12. A vibration-isolating mounting comprising a bed plate, a load-bearing plate, spring means supporting the load-bearing plate from the bed plate, means for varying the natural vibration frequency of said spring means, a resilient compressible non-metallic member overlying said load-bearing plate and arranged to support a vibratory device, and means for yieldingly restraining excessive movements of said spring means.

ALANSON M. GRAY, JR.
JOHN S. PARKINSON.